United States Patent [19]

Hoodenpyle et al.

[11] Patent Number: 5,003,818
[45] Date of Patent: Apr. 2, 1991

[54] AIRCRAFT BRAKE TESTER

[75] Inventors: James W. Hoodenpyle, Fort Worth; James P. Robinson, Smithfield; John W. Wright, Arlington, all of Tex.

[73] Assignee: Howell Instruments, Inc., Fort Worth, Tex.

[21] Appl. No.: 466,950

[22] Filed: Jan. 18, 1990

[51] Int. Cl.⁵ .............................................. G01L 5/28
[52] U.S. Cl. .................................................. 73/121
[58] Field of Search ................. 73/121, 128, 129, 132; 364/424.03, 424.04, 426.01, 579; 188/1.11

[56] References Cited

U.S. PATENT DOCUMENTS

| | | | |
|---|---|---|---|
| 1,584,076 | 5/1926 | Bristol | 73/128 |
| 1,822,463 | 9/1931 | Taber | 73/132 |
| 2,117,027 | 5/1938 | Langbein | 73/129 |
| 2,182,554 | 12/1939 | Galle | 73/129 |
| 4,697,464 | 10/1987 | Martin | 73/168 |
| 4,719,796 | 1/1988 | Zenker | 73/121 |

Primary Examiner—Robert Raevis
Attorney, Agent, or Firm—Cushman, Darby & Cushman

[57] ABSTRACT

An aircraft brake tester includes pressure transducers to detect pressure levels in each of a plurality of hydraulic lines connected to each of a plurality of aircraft disc brake cylinders, respectively. Each aircraft disc brake includes a set of cylinders, each connected to one of a set of hydraulic lines. Each respective hydraulic line exerts a hydraulic pressure to a respective cylinder engaged with the hydraulic line potentially resulting in different cylinders on the same aircraft brake receiving different hydraulic pressures. The pressure transducers convert the detected pressure levels into analog signals and output the analog signals to a processor. The processor digitizes, references and calibrates the analog signals into actual pressure values and simultaneously displays the actual pressure values. The processor then obtains difference data corresponding to the difference in pressure exerted on each cylinder of a tested brake assembly as an indication of the exertion of differing pressures on respective cylinders of the brake assembly.

12 Claims, 8 Drawing Sheets

AIRCRAFT BRAKE TESTER

BACKGROUND OF THE INVENTION

1. Field of the Invention

This invention relates to aircraft brake testers. More particularly, this invention relates to apparatus for testing a plurality of brake cylinders on a plurality of aircraft disc brakes.

2. Description of the Related Art

Aircraft are equipped with a plurality of disc brakes, each having a brake shoe on each side of a brake disc. During the braking operation, a set of cylinders for each brake, one for each shoe, presses the shoes against the brake disc to frictionally stop the rotation of the brake disc. The cylinders are hydraulically actuated, with each brake being hydraulically actuated independently of the remaining brakes and each cylinder within each brake being hydraulically actuated independently of the remaining cylinders.

Occasionally, due to, for example, a leak in the hydraulic system or a malfunctioning brake valve, the hydraulic system will not uniformly apply pressure to each of the cylinders. In this event, one brake of the plurality of brakes may not stop the rotation of the respective brake disc at the same rate as another brake would stop the rotation of its respective brake disc. Still further, one cylinder of a particular brake may not press against its respective brake shoe with the same force as the oppositely disposed cylinder of the same brake. In either case, the pilot may be unable to smoothly and safely bring the aircraft to a stop if the cylinders of each respective brake are not uniformly pressing the brake shoes or if the brakes of one wheel of the airplane are not stopping at a uniform rate as brakes of another wheel of the airplane.

Methods and apparatus for testing the pressure level in a hydraulic line are known. A method and apparatus, however, is needed to simultaneously detect the pressure levels in the hydraulic lines applied to each of the cylinders for a plurality of disc brakes and to calculate subtle differences between the instantaneous pressure levels to diagnose brake defects before the potential occurrence of significant brake failure.

SUMMARY OF THE INVENTION

To satisfy the need for simultaneously analyzing the braking operation of a plurality of brake cylinders for a plurality of aircraft brakes and to detect subtle differences in the brake pressure between the respective brakes and between the respective brake cylinders, a digital aircraft brake tester measures and displays the instantaneous, operational brake hydraulic pressures exerted on each brake shoe of each brake on an aircraft. The brake tester is portable and includes the necessary hardware to test a variety of different aircraft using the same testing apparatus.

Pressure transducers are coupled to hydraulic lines of each cylinder in the plurality of aircraft brakes by pressure hoses and adapters for the particular aircraft brake assemblies. The pressure transducers generate analog signals indicative of the pressures exerted by the respective cylinders, to which the transducers are coupled, and output the signals to a portable electronic unit. The electronic unit measures and displays the brake pressure for each of the brake cylinders substantially simultaneously, based on the information received from the respective transducers. The electronic unit continually updates the pressure information for each cylinder and, upon a prompt from the user, simultaneously displays the differential pressures between the pairs of cylinders of each tested brake assembly. In this manner, subtle pressure differences between the respective brake assemblies and between the respective brake cylinders may be quickly and easily detected at an early stage to reduce the possibility of major brake failure.

BRIEF DESCRIPTION OF THE DRAWINGS

In accordance with these and other objects which will become apparent, the present invention is described with particular reference to the accompanying drawings, in which.

DETAILED DESCRIPTION OF THE PRESENTLY PREFERRED EMBODIMENTS

Figure 1:
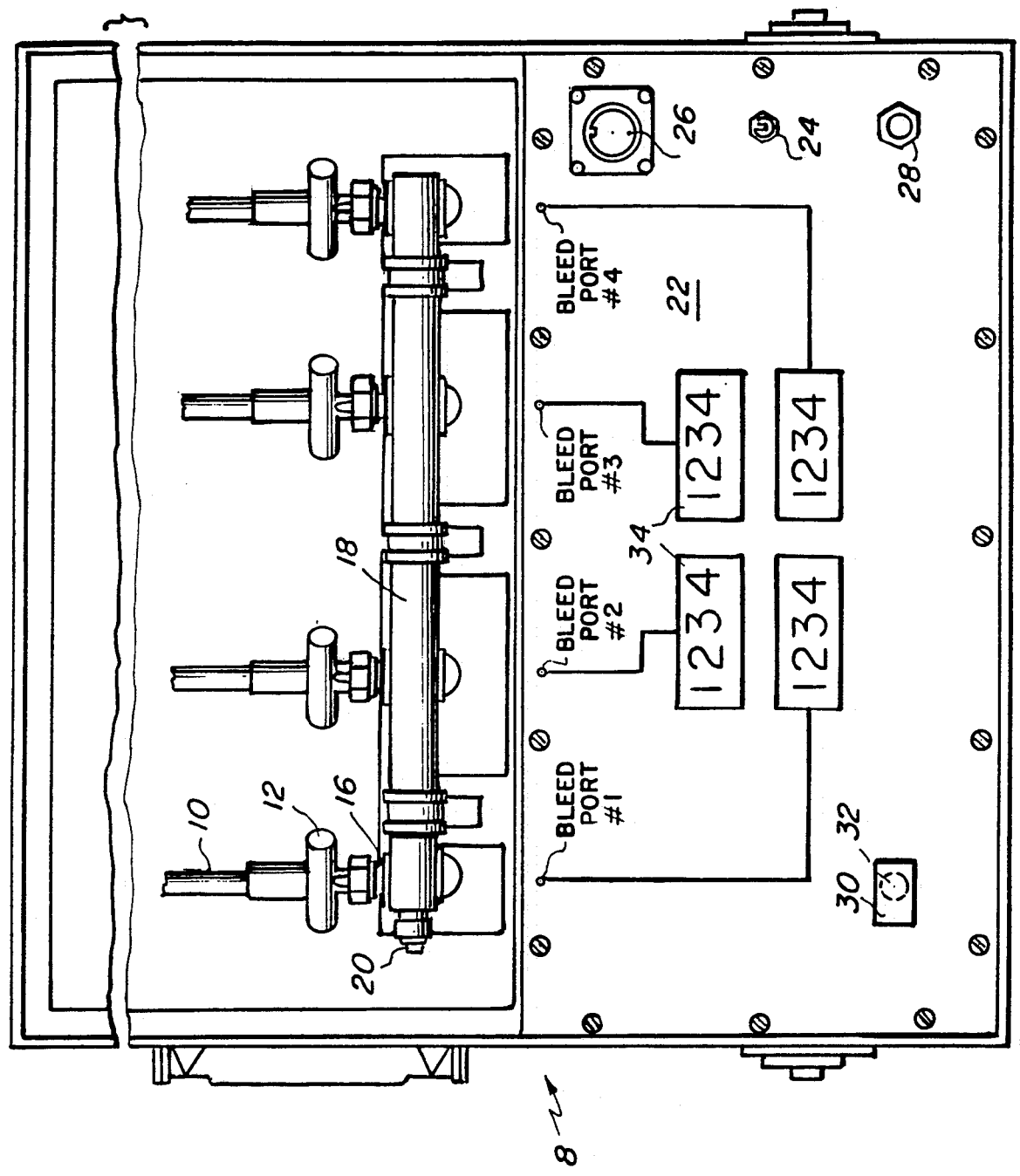
FIG. 1 is a top view of the brake tester apparatus according to the present invention.

According to a first embodiment of the present invention, a set of pressure transducers is attached to the hydraulic lines of the brake cylinders for a plurality of aircraft brakes. Each aircraft brake has first and second cylinders to be pressed against a brake disc during a braking operation and has first and second hydraulic lines, connected to the first and second cylinders, respectively. In the test apparatus 8 of FIG. 1, high pressure hoses 10 and adapters 11 (shown in FIG. 4) are used to tap a portion of the hydraulic brake fluid for each cylinder of the plurality of brake assemblies and transport the fluid to the tester apparatus 8.

Each pressure transducer measures the pressure within the hydraulic line actuating one brake cylinder and may be sensitive to pressures between 0 and 5000 psig. The pressure transducers convert the actual pressure within the hydraulic lines into analog voltages, which are input to the electronic hardware as an indication of the actual hydraulic pressures within the hydraulic lines.

Bleed valves 12 may be mounted near each pressure transducer to allow the operator to bleed the aircraft brake system before testing the hydraulic pressure levels. As an option, the hoses 10 may have self-sealing quick disconnecting ends 35 to prevent brake fluid leakage when the hoses are stored.

The test apparatus 8, shown in FIG. 1, is equipped with four bleed ports 16, each connected to the hydraulic line of one cylinder of the aircraft brake assembly through an adapter, a high pressure hose 10, and a common bleed manifold 18. The individual brake lines may be individually bled through the individual bleed valves 12 through the bleed manifold 18 and a bleed hose (not shown) attached to fitting 20 of the manifold.

The face 22 of the test apparatus includes a power switch 24 and a power input connector 26. The test apparatus may be powered by a 115±10% Volts AC, single phase, 50 to 400 Hz signal input to the power input 26. The face 22 also includes a differential pressure switch 28 which controls the differential pressure function of the tester, such that, when the differential pressure switch is depressed, the tester calculates and displays the differential pressures for the pair of cylinders at each of the tested brakes. When the differential pressure switch is released, the tester continuously and simultaneously displays the individual pressures exerted on each cylinder of each brake.

The face 22 also includes a calibration access 30 providing access to a calibration switch on the electronic display board within the tester 8. The calibration access 30 may be secured by a calibration tag 32 to limit entry into the calibration access to prevent calibration tampering.

Finally, the face 22 includes a set of displays 34 to display the instantaneous pressure values for each of the hydraulic lines connected to the brake cylinders and to display instantaneous values of the pressure differentials when the user requests this information by depressing the differential pressure switch 28.

In the tester of FIG. 1, four hydraulic pressures are measured and displayed, corresponding to two brake assemblies each having two brake cylinders. Alternatively, the tester of FIG. 1 may measure and display four brake assemblies each having a single cylinder. The brake fluid for each cylinder is fed into a respective bleed port 16 where the cylinder pressure is measured by respective pressure transducers. Each cylinder pressure is then displayed in a bleed port display 34 corresponding to the bleed port 16 in which the brake fluid for the respective cylinder is fed. The hydraulic pressures are displayed simultaneously and are updated instantaneously as the hydraulic pressures for each cylinder change. For example, in FIG. 1, the display simultaneously indicates four instantaneous pressure values of 1234 psi for each of the four cylinder pressures. When the differential pressure switch 28 is depressed, the displays will clear the instantaneous pressure values and indicate the differential pressure between the two cylinders of each of the two respective brake assemblies tested. The location of the higher pressured cylinder is identified by displaying the differential value in the display 34 associated with the bleed port 16 connected to the higher pressured cylinder.

Figure 2:
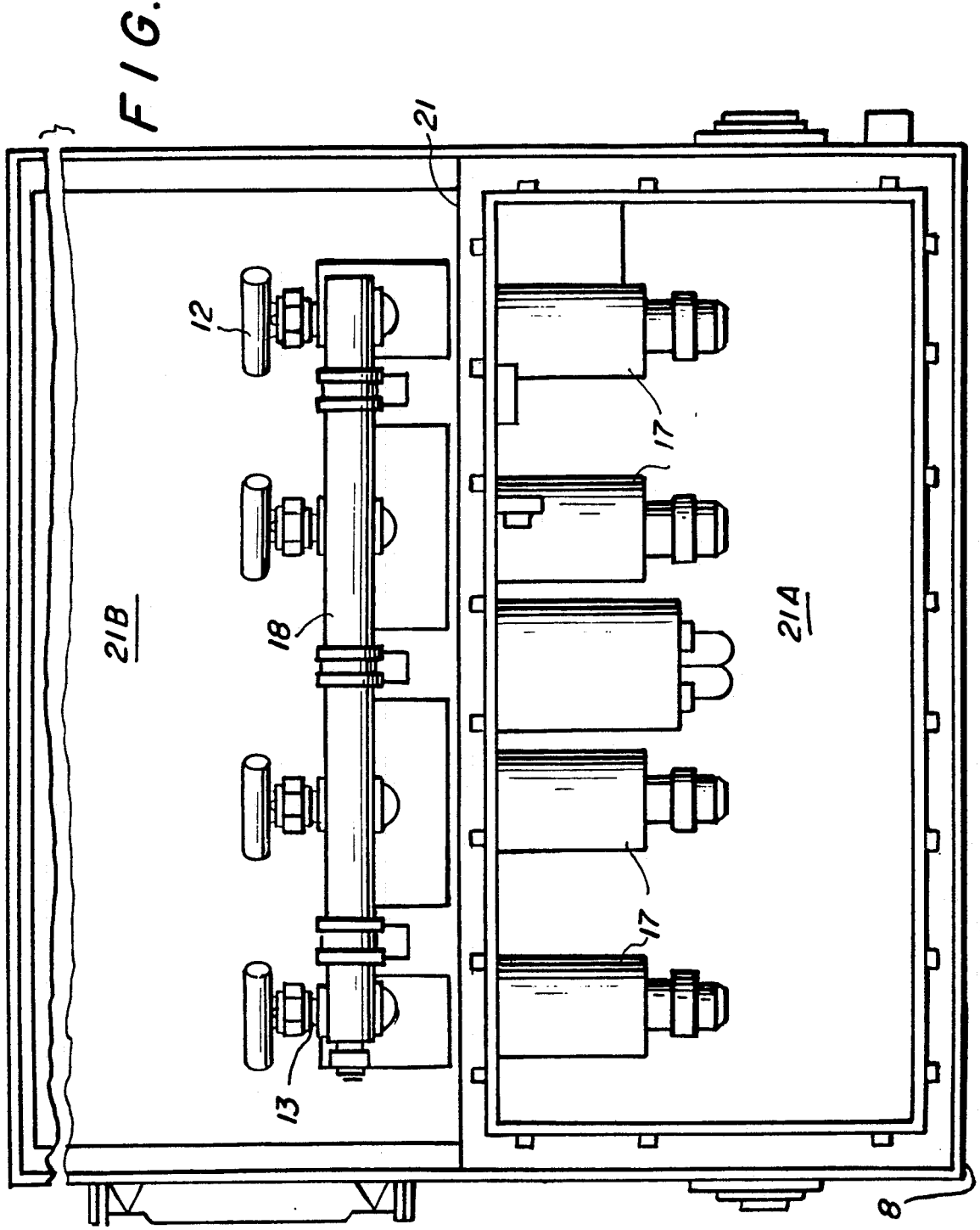
FIG. 2 is a top view of the brake tester apparatus of FIG. 1 with the display face removed.

FIG. 2 illustrates the brake tester of FIG. 1, without the display face 22. As shown in FIG. 2, a partition 21 separates an electronics region 21A from a fluid mechanics region 21B to prevent the passing of fluid from the fluid mechanics to the electronics. The electronics region 21A is located behind the display face 22 and includes a set of four pressure transducers 17, which measure the hydraulic fluid pressure in the four respective hoses 10. A set of four plumbing assemblies 13 are connected between the hoses 10 and the transducers 17 to channel the flow of brake fluid between the aircraft brake assembly and the tester apparatus.

Figure 3:
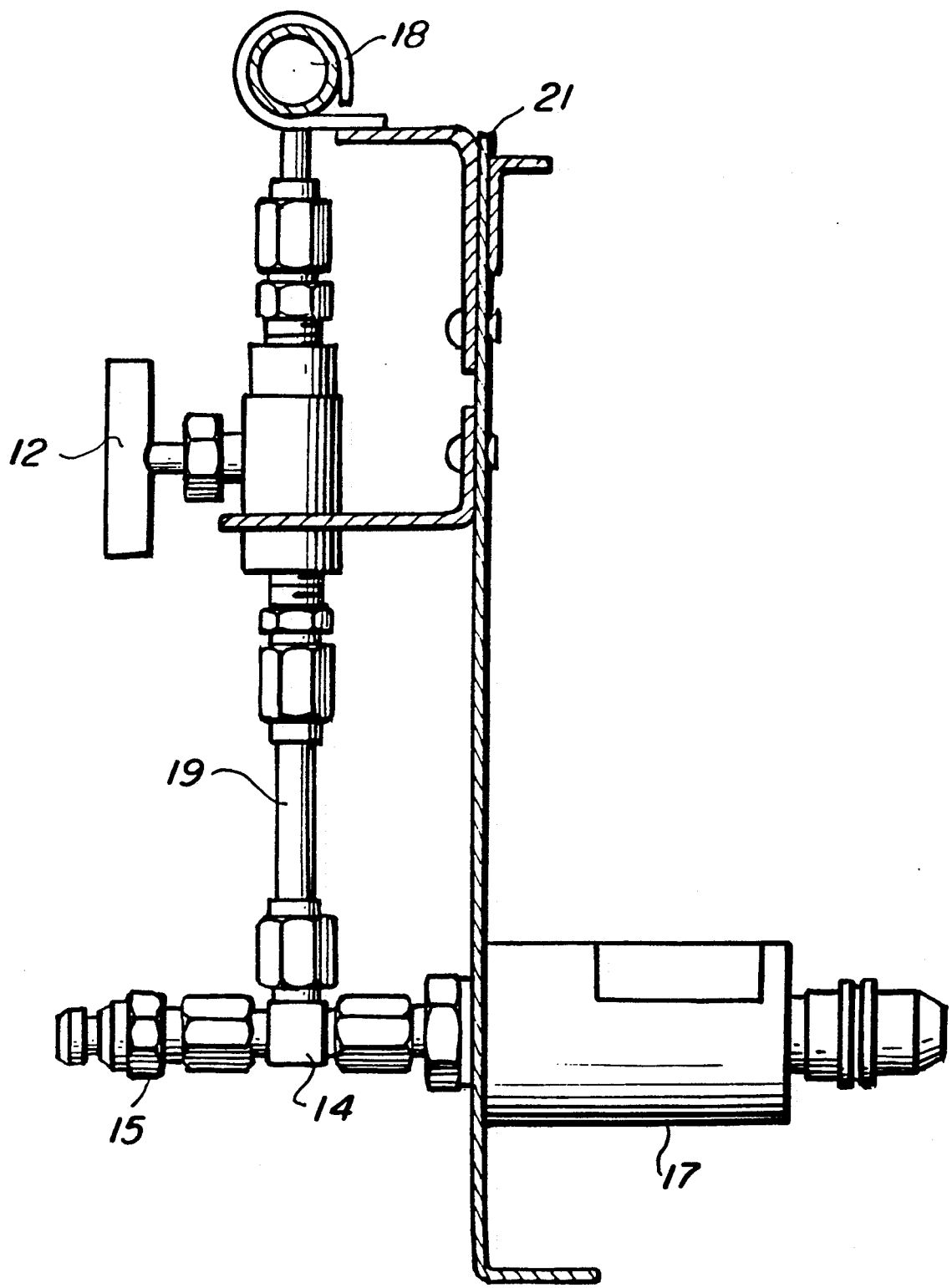
FIG. 3 is a side section view of the plumbing assemblies of the brake tester assembly of FIG. 1.

FIG. 3 illustrates the plumbing assembly 13 in greater detail. The plumbing assembly 13 includes a T-coupler 14 which connects a quick disconnect fitting 15 with the transducer 17 and a tube 19. The tube 19 then connects the valve 12 which, in turn, connects the bleed manifold 18. Hose assembly 10 connects the aircraft brake assembly to the fitting 15 to deliver the brake fluid from the hydraulic brake lines of the aircraft to the transducer assembly 17 of the tester apparatus 8. As shown in FIG. 2, four of the plumbing assemblies of FIG. 3 are provided in the tester apparatus 8.

Figure 4:
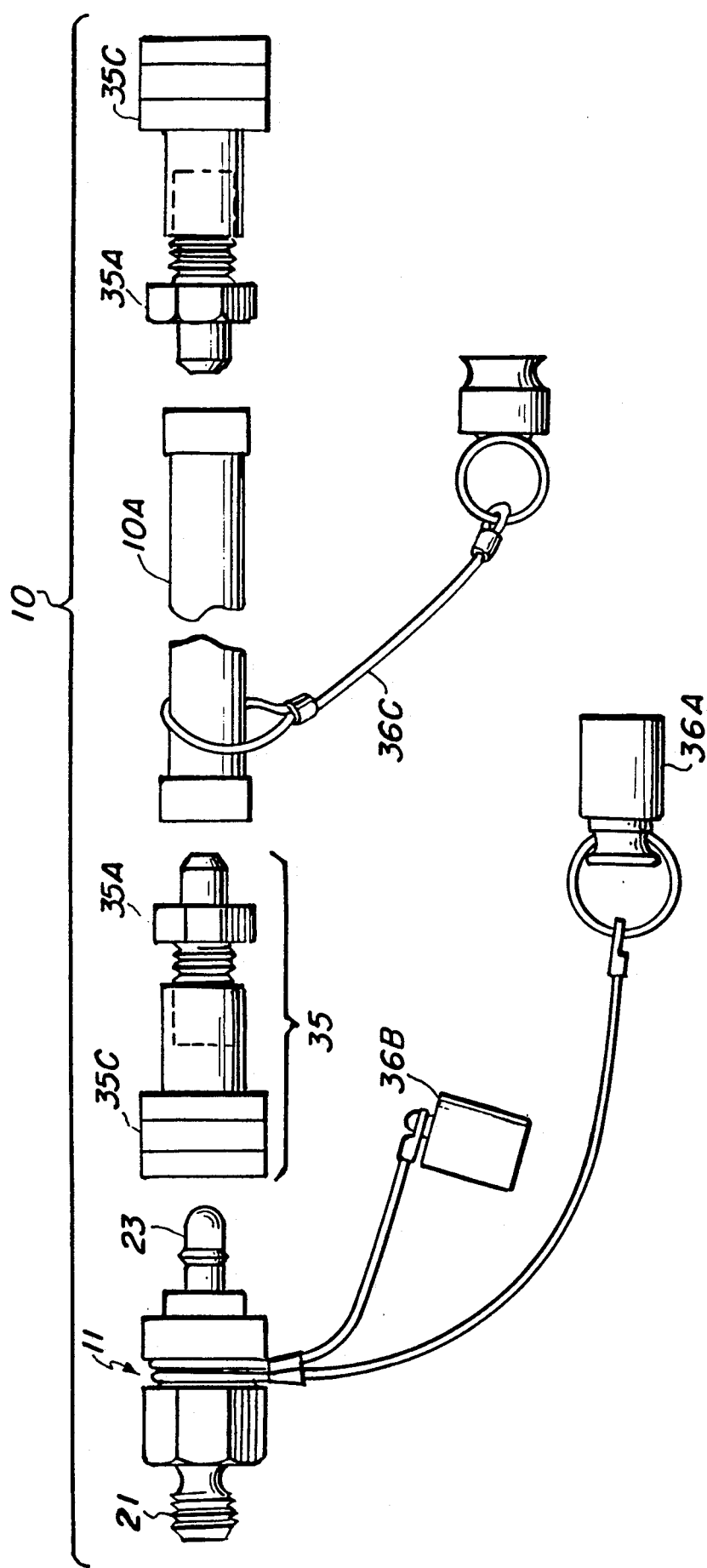
FIG. 4 is a view of a hydraulic brake hose and adapter according to the present invention.

FIG. 4 illustrates the hose assemblies 10 used to tap and feed the brake fluid from each cylinder into a corresponding bleed port 16. The hose assemblies include a hose 10A, two quick disconnect couplers 35, and an adapter 11. The quick disconnect couplers 35 are connected to the ends of the hose 10A by an adapter fitting 35A connected to a collar type quick disconnect coupler 35C. The adapters 11 have a fitting 23 adapted to connect one of the two quick disconnect couplers 35 attached to the hose 10A. Opposite the fitting 23, the adapters 11 include a fitting 21 structurally matched to connect particular brake valves on the hydraulic lines of the particular aircraft brake being tested. Opposite the adapter 11, a quick disconnect coupler 35 attaches to the hose 10A to connect with the fitting 15 of the tester assembly shown in FIG. 3. The hose assemblies are thus tailored to attach the hydraulic lines of the particular model of aircraft being tested to the fittings 15 of the brake tester 8. The adapters 11 are easily removable from the quick disconnect coupler 35 such that a particular adapter 11 corresponding to a particular type of aircraft to be tested may be quickly attached to the hose 10A to accommodate the present tester to any number of aircrafts requiring any number of different types of adapters 11. The quick disconnect couplers 35 are then structurally matched to connect any of the plurality of types of adapters 11 as well as the fitting 15 of the valve assembly 13 of the brake tester apparatus 8. With the proper adapters, the present testing apparatus may be generically used with any model aircraft.

FIG. 4 also illustrates cap 36B, which covers the fitting 21 when the adapter is not in use, and cap 36A, which covers the quick disconnect fitting 23. Additional caps 36C may cover the quick disconnect couplers of the hose assembly 10. The quick disconnect couplers 35 may have self-sealing ends to seal the hose 10 assembly at each end to prevent hydraulic fluid within the hose 10A from leaking from the hose when the hose is not attached between the adapter 11 attached at the aircraft bleed valve and the bleed port 16 of the tester 8.

Figure 5:
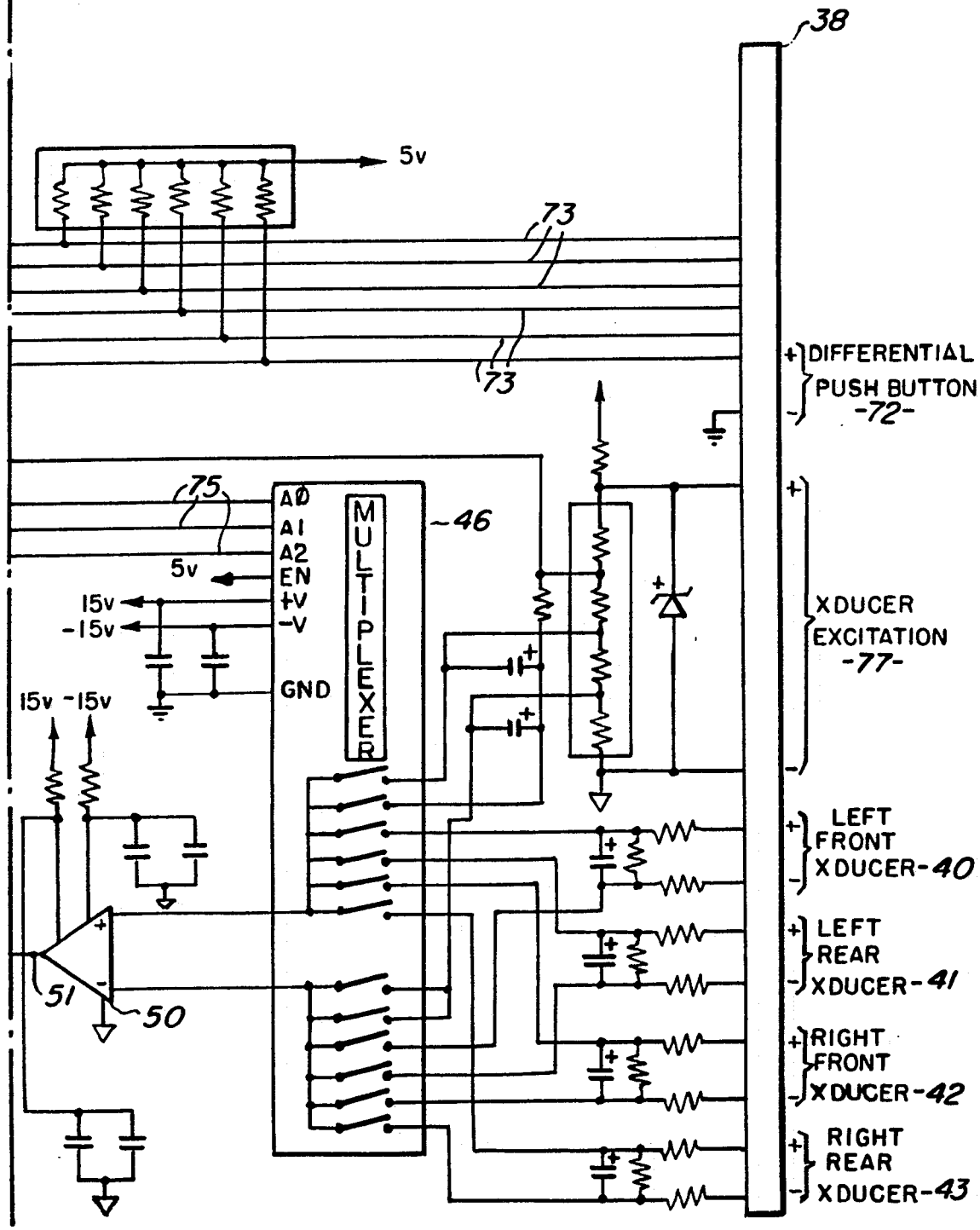
FIGS. 5-7 together illustrate a schematic diagram of the electronic controller according to the present invention.
Figure 6:
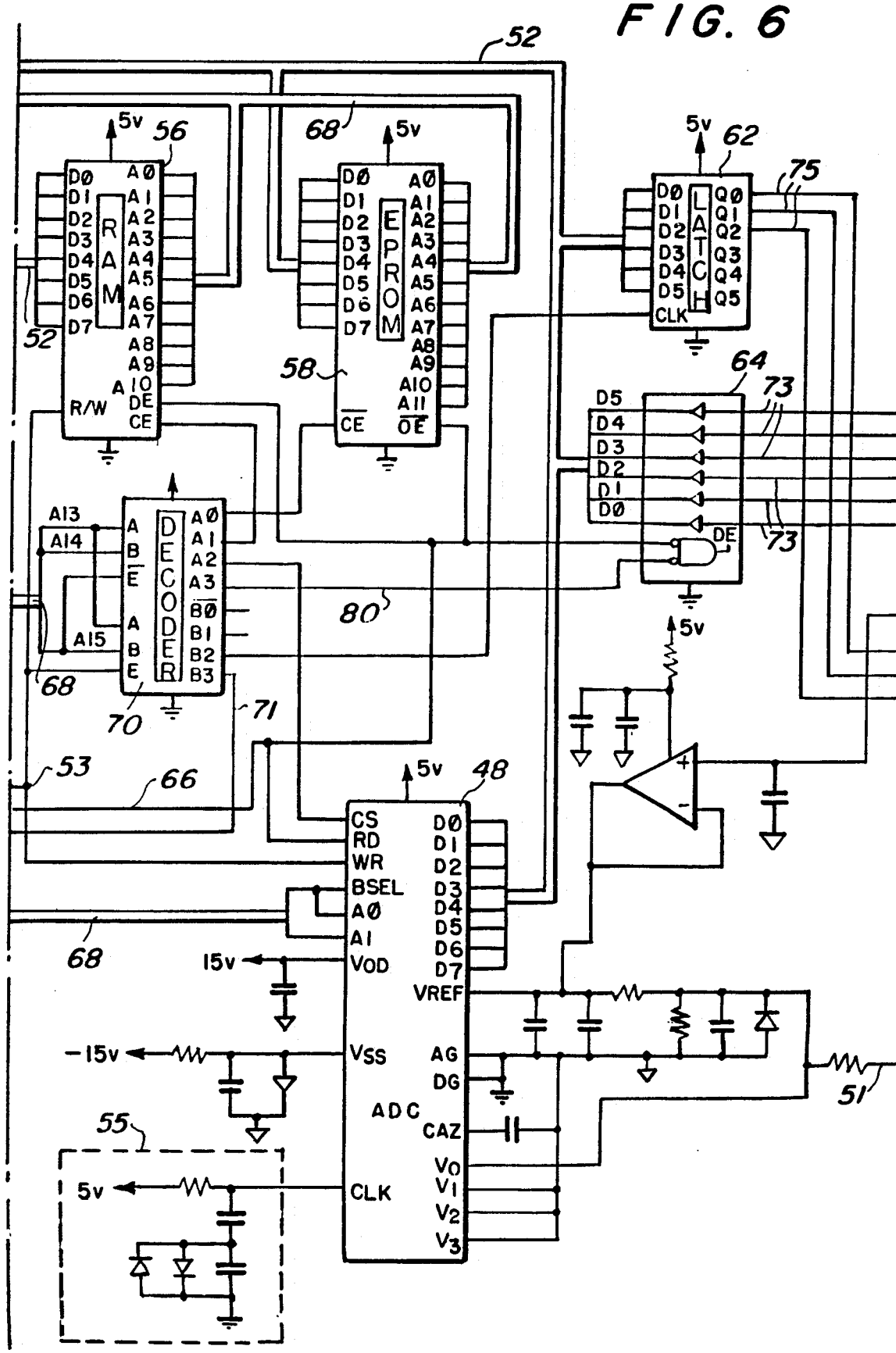
Figure 7:
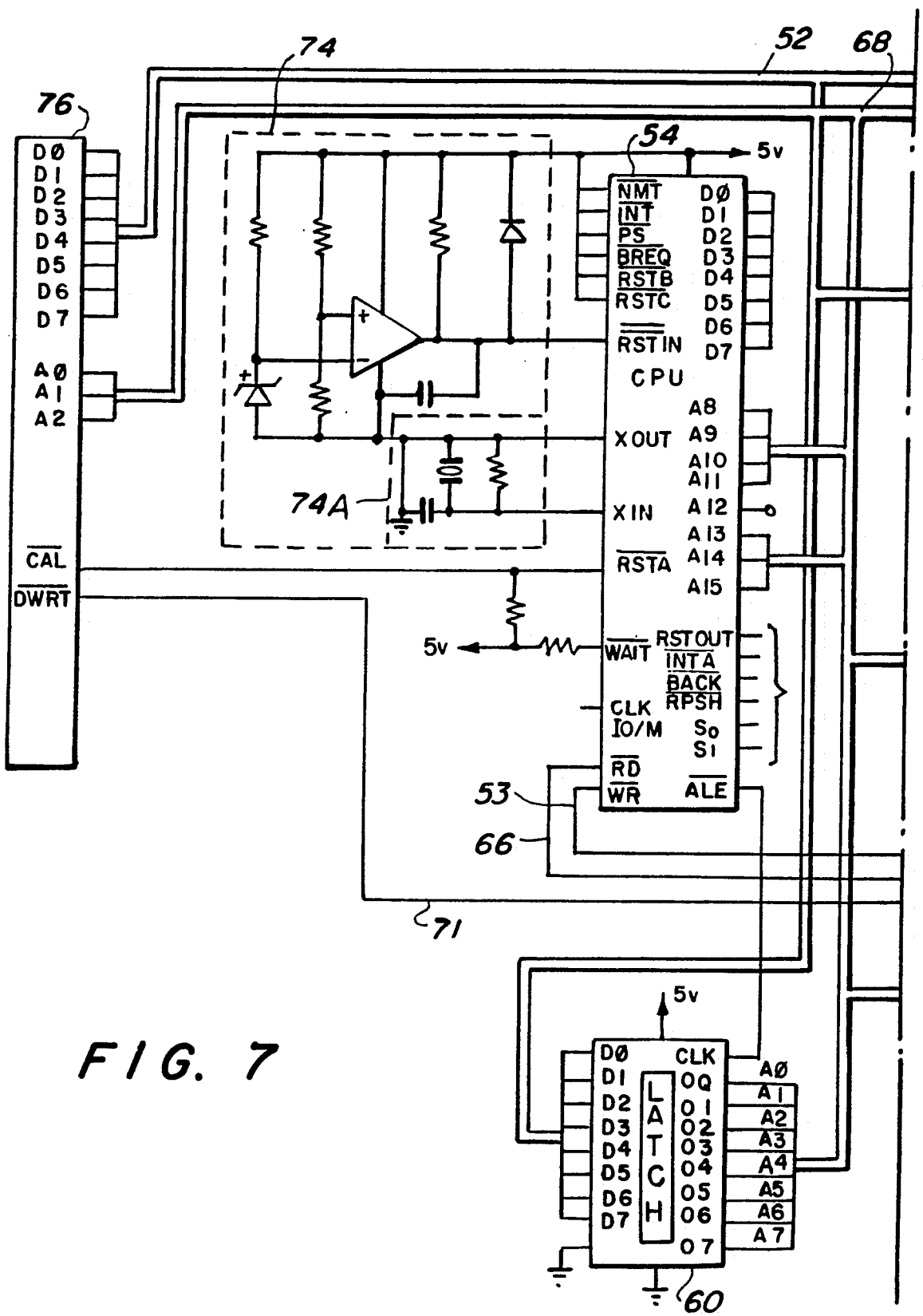

Referring now to FIGS. 5-7, which together illustrate the electronic controller of the brake tester 8, the brake tester includes electronics to control the measurement, display and processing of the cylinder pressure data. Analog signals, generated by the pressure transducers and corresponding to the pressure levels within the hydraulic lines of each brake cylinder, enter the electronic hardware through a connector 38 in FIG. 5. The left front 40, left rear 41, right front 42 and right rear 43 transducer signals pass through connector 38 and are individually switched into the processing circuitry by multiplexer 46. The output of the multiplexer 46 is connected to the input of an analog to digital converter (ADC) 48 (FIG. 6) through an amplifier 50 via connection 51. The amplified analog transducer signals are converted into digital signals by the ADC 48 and output onto the data bus 52 upon the prompt of a read signal 66 from the CPU 54 (FIG. 7). Clock circuit 55 (FIG. 6) clocks the data conversion within the ADC 48. While four transducer input signals 40-43, corresponding to two brake cylinders for each of two brakes, are described in this embodiment, the invention is not limited to four transducer input signals and may be modified to monitor any number of brake cylinders and to input a corresponding number of transducer input signals to the tester electronics.

The data bus 52 from the ADC 48 connects the CPU 54 in FIG. 7, non-volatile RAM 56 in FIG. 6, EPROM 58 in FIG. 6, octal latch 60 in FIG. 7, latch 62 in FIG. 6, and tri-state buffer 64 in FIG. 6. Once the pressure data is output onto the data bus by the ADC 48, the CPU 54 reads the data into memory by the prompt of the write signal 53. The CPU 54 may then issue a write signal 53 to the ADC 48 to enable the ADC to read the next analog transducer pressure signal from the multiplexer 46, to process the analog signal into a digital signal, and to await a prompt to write the new digital signal onto the data bus 52.

The flow of data within the electronics is generally controlled by a sixteen bit address line 68. The CPU 54 generates sixteen address bits and octal latch 60 separates the CPU lower (0-7) address from data that shares the same lines. The first twelve bits, A0 through A11, are generally assigned as memory addresses, the thirteenth bit, A12, is idle, and the last three bits, A13 through A15, are assigned to electronics control functions as further described below. The RAM 56 is connected to the CPU 54 through the address bits A0 through A10 and continually stores the digital pressure data placed on the data bus by the ADC 48 for future retrieval. The EPROM 58 is connected to the CPU 54 through address bits A0 through A11 and contains the permanent program for the processing operations to be performed on the incoming digital pressure data.

Address bits A13 through A15 are input to the dual quad decoder 70 to expand the number of usable control signals from the three bits (A13-A15) output by the CPU 54 to a potential of eight bits output by the decoder 70. With this arrangement, the CPU 54 may control eight functions of the various electronic components using the three address bits A13 through A15. Of the eight potential output signals from the decoder 70, six are used and control (1) the chip enable function of the EPROM 58, (2) the chip enable function of the RAM 56, (3) the read/write enable function of the ADC 48, (4) an enable signal for the tri-state buffer 64, (5) the clock signal for the six bit latch 62, and (6) the enable signal 71 for the digital displays.

The differential pushbutton signal 72, from the differential pressure switch 28, is connected to a predetermined number (in this case, one) of the data input lines 73 of the tri-state buffer 64 through connector 38 to cue the CPU 54 that the user has requested differential pressure data as further described below.

The power-on-reset network 74 applies a reset to the CPU 54 when there is low power voltage. The timing network 74A is connected to the CPU 54 to clock the processing operations of the CPU.

The outputs 75 of the six bit latch 62 are connected to the address lines of the multiplexer 46 to control the selections of pressure data from the transducer signal inputs 40-43.

Figure 8:
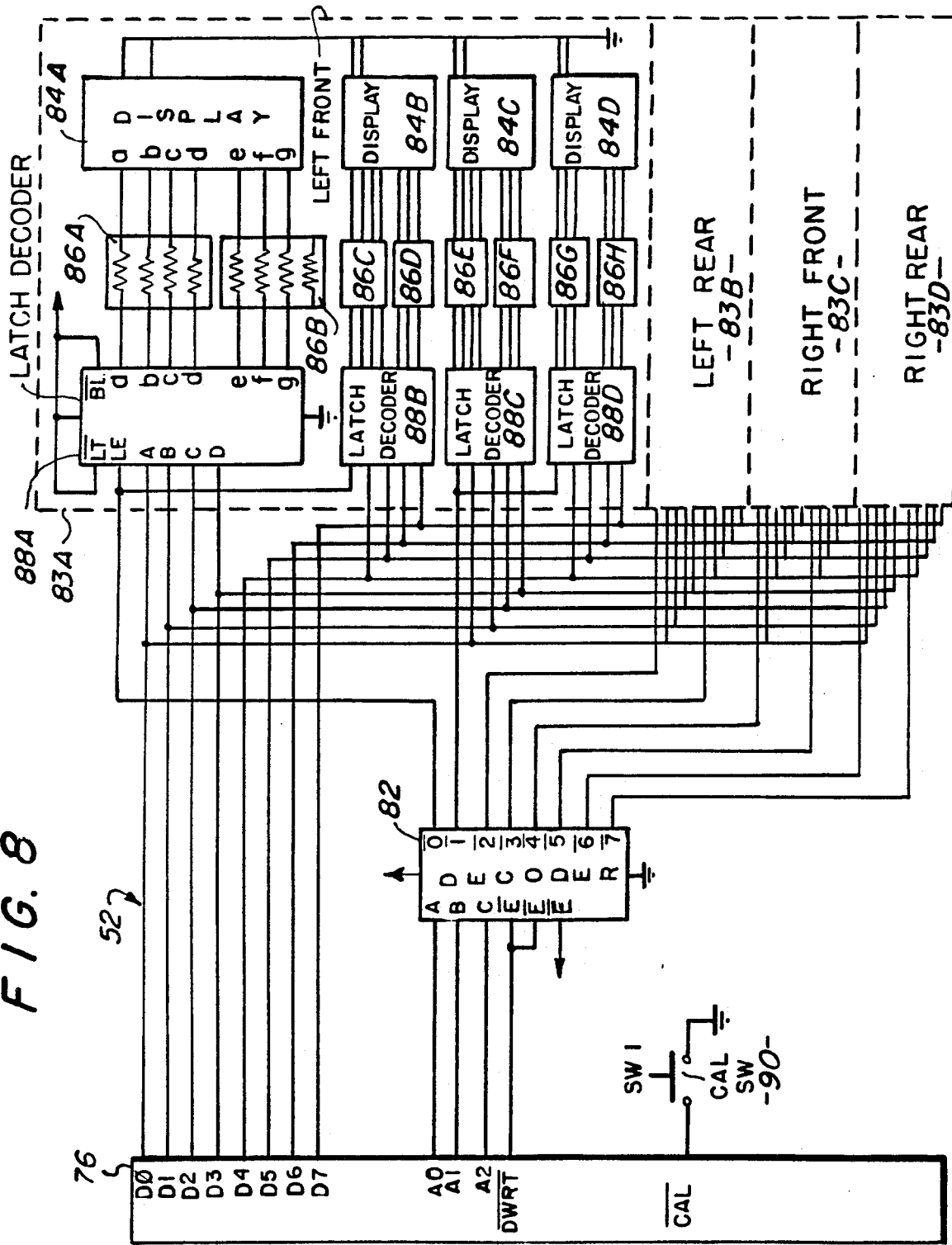
FIG. 8 is a schematic diagram of the display board according to the present invention.

Finally, a connector 76 attaches to the display board of FIG. 8 to transfer power, control and data lines to the display board.

In operation, the transducer pressure signals 40-43 are input to the multiplexer 46 by the pressure transducers attached to the brake cylinder lines via the hoses 10. The signals 40-43 thus change as the instantaneous pressures to the brake cylinders change. The transducer pressure signals 40-43 are referenced against a transducer excitation signal 77, which is input to the ADC 48 as a reference voltage. The CPU 54 requests the multiplexer 46 to switch a particular transducer signal 40-43 into the amplifier 50 by directing the latch 62 to output a three bit address 75, corresponding to the desired transducer data signal, to the multiplexer 46. Receipt of the three bit address 75 from the latch 62 then causes the multiplexer 46 to switch the requested signal into amplifier 50.

Once released from the multiplexer 46 and amplified by amplifier 50, the selected pressure signal is input to the ADC 48. The ADC 48 then converts the analog signal into digital form. CPU 54 issues a read instruction 66 to the ADC and simultaneously enables the decoder to issue a chip enable signal to the ADC 48. This prompts the ADC to release the digitized pressure signal onto the data bus 52 to the CPU 54 which inputs and stores the signal in RAM 56. The CPU 54 may then prompt the multiplexer 46 to release another transducer pressure signal into the amplifier to ultimately be stored in RAM 56, as described above.

Periodically, the CPU 54 will test for the depression of the differential pressure switch 28. For the embodiment show in FIG. 5, when depressed by the user, the differential pressure switch 28 pulls the least significant input bit D0 to the tri-state buffer 64 low. Then, as the CPU 54 issues a read request 66, the active low read request 66 will enable one of two enabling inputs to the tri-state buffer 64. The additional enabling input of the tri-state buffer is enabled by a decoder output 80 from the decoder 70 upon the input of a proper three bit control address to the decoder 70 from the CPU 54. With both the enabling read request 66 and the enabling decoder signal 80, the tri-state buffer is enabled to write the differential pressure switch signal 72 onto the data bus as the least significant data bit, D0. When the tri-state buffer is enabled and the differential pressure switch is depressed, the CPU can readily detect the low level D0 data bit on the data bus as an indication that the user is requesting a differential pressure analysis.

Having detected that the differential pressure switch 28 is depressed, the CPU 54 then executes the differential pressure program to calculate the differences between the current transducer pressures being applied at each pair of cylinders for each brake assembly on the aircraft. After calculating all the differentials, the CPU outputs the differential data onto the data bus 52 to the displays 34 for display.

Referring to FIGS. 7 and 8, the data bus along with three identifying address bits are input to the display circuit of FIG. 8 from the control circuit of FIGS. 5-7 through the connector 76. The three address bits identify the particular cylinder associated with the current pressure data on the data bus 52. The address bits are input to a decoder 82, which enables the display 34 assigned to the particular cylinder identified by the three address bits to display the data currently on the data bus 52. The data on the data bus may be the instantaneous pressures at the pressure transducers or may be the calculated differential pressures. In the former case, all displays will display a current pressure reading for the brake cylinder assigned to each respective display. In the latter case, only the displays which correspond to the cylinder having the highest pressure of the pair of cylinders of each brake assembly will display the differential pressure value.

One display circuit is provided for each of the cylinders to be simultaneously tested, which, in the embodiment of FIGS. 1-8, includes four cylinders and four display circuits 83A-83D. Each display circuit 83A-83D includes four single digit, seven segment displays 84A-84D, eight resistive networks 86A-86H, and four latch decoders 88A-88D. The data bus 52 is input to each of the latch decoders 83A-83D, which latch the data through the respective resistive networks 86A-86H to the displays 84A-84D where the data is visibly displayed. Latch decoders 88B-88D are identical to latch decoder 88A and are connected in the same fashion as latch decoder 88A, with the exception that the enable line LE from the decoder 82 to the decoders 88A-88B will differ from the enable line LE from the decoder 82 to the decodes 88C-88D as shown in FIG. 8. Similarly, the configurations of the pairs of resistive networks 86C-86H and of the displays 84B-84D are connected in the same fashion as resistive network pair 86A-86B and display 84A, respectively. Finally, display circuits 83B-83D are connected in the same fashion as display circuit 83A, with the exception of the unique enabling lines from the decoder 82 to the respective circuits 83A-83D, as shown in FIG. 8.

The calibration switch 90 for the tester 14 is also located on the display board of FIG. 8. The calibration switch 90 is accessed through the calibration access 30, shown in FIG. 1. The calibration switch is connected to the reset line of the CPU 54 through the connector 76.

While the invention has been described with respect to the display of differences between hydraulic pressures exerted on respective cylinders of an aircraft brake, difference signals between respective pressures on a first cylinder of a first aircraft brake on an aircraft and a second cylinder of a second aircraft brake on the aircraft may also be displayed as a indication of subtle differences in the braking operation of one aircraft brake assembly of a same aircraft and another aircraft brake assembly of the same aircraft. Similarly, pressure differentials may be calculated between the cylinder pressures of the brake assemblies of different aircraft.

While the applicant has described the invention in what the applicant considers the most practical, preferred embodiments, the applicant does not limit the present invention to the disclosed embodiments, but, on the contrary, intends the invention to cover various modifications and equivalent arrangements included within the spirit and scope of the appended claims.

What is claimed is:

1. An aircraft brake tester adapted to test hydraulic pressures in a plurality of aircraft brake lines corresponding to respective cylinders of an aircraft brake, comprising:
    a plurality of pressure transducers connected to corresponding ones of the aircraft brake lines to output pressure signals corresponding to the hydraulic pressure in each of the plurality of aircraft brake lines;
    processing means, connected to the plurality of pressure transducers, for selecting the pressure transducers, for memorizing the pressure signals output by the selected pressure transducers, and for calculating a difference signal according to the pressure signals corresponding to the selected pressure transducers; and
    means for indicating the memorized pressure signals and for indicating the difference signal.

2. A brake tester according to claim 1, wherein the processing means sequentially and continually selects current pressure signals and updates the difference signal based on the calculated difference between the current pressure signals.

3. A brake tester according to claim 2, further including switch means for selecting the indication means to indicate either the current pressure signals or the updated difference signal.

4. A tester according to claim 1, further including:
    individual bleed means, connected in parallel to the pressure transducers, for individually bleeding each respective hydraulic line.

5. A tester according to claim 1, further including:
    a portable casing, the casing including the pressure transducers, the processing means and the indicating means.

6. An aircraft brake tester adapted to test a plurality of aircraft disc brakes on a plurality of different aircraft, each aircraft brake including a set of hydraulic lines, a plurality of cylinders, a plurality of brake shoes and a brake disc, each respective hydraulic line engaging a respective cylinder and being characterized by a hydraulic pressure, each respective cylinder adapted to press a respective shoe against the brake disc, and each brake disc being pressed by a plurality of brake shoes, the tester comprising:
    a plurality of pressure transducers, one pressure transducer being provided for each of the plurality of cylinders for the plurality of aircraft brakes to be tested;
    means, connected to the hydraulic lines and to the pressure transducers, for transferring the hydraulic pressure from each hydraulic line to the pressure transducers, the pressure transducers converting the hydraulic pressure for each hydraulic line into a plurality of pressure signals, each respective pressure signal characterizing the pressure exerted by the respective brake shoe on the brake disc of a respective aircraft brake;
    means, connected to the transfer means, for adapting the transfer means to connect to the hydraulic lines of a plurality of different aircraft;
    processing means, connected to the pressure transducers, for receiving the pressure signals from the pressure transducers, for generating difference signals, in response to the pressure signals, corresponding to the difference in the pressure exerted by each respective brake shoe of a particular aircraft brake and each other respective brake shoe of the particular aircraft brake, and for repeating the generation of difference signals for each of the plurality of aircraft brakes being tested; and
    display means, connected to the processing means, for simultaneously indicating the pressure signals for each hydraulic line of the plurality of hydraulic lines and for indicating the difference signals generated by the processing means.

7. A brake tester according to claim 6, wherein the processing means sequentially and continually selects current pressure signals and updates the difference signal based on the calculated difference between the current pressure signals.

8. A brake tester according to claim 7, further including switch means for selecting the display to indicate either the current pressure signals or the difference signal.

9. A tester according to claim 6, further including:
    individual bleed means, connected in parallel to the pressure transducers, for individually bleeding each respective hydraulic line.

10. A tester according to claim 6, further including:
a portable casing, the casing including the pressure transducers, the processing means and the display means and being adaptable to house the transfer means and the adapting means.

11. A method of testing aircraft disc brakes, comprising the steps of:
(1) tapping a plurality of hydraulic brake lines having a plurality of hydraulic pressures, each hydraulic brake line exerting a hydraulic pressure on one cylinder of an aircraft brake;
(2) generating pressure signals corresponding to the pressure exerted by the plurality of hydraulic lines on the plurality of cylinders;
(3) simultaneously displaying the pressure signals for each cylinder of the aircraft brake;
(4) generating at least one differential signal corresponding to the difference between the pressure exerted on each cylinder of the aircraft brake and the pressure exerted on at least one other cylinder of the aircraft brake;
(5) displaying the at least one difference signal; and
(6) repeating steps (2) through (5) for each of a plurality of aircraft brakes.

12. A method according to claim 11, further including the step, after the step 1, of:
(7) bleeding the hydraulic lines.

* * * * *